United States Patent
Bryson et al.

(10) Patent No.: US 10,243,930 B2
(45) Date of Patent: Mar. 26, 2019

(54) SYSTEMS AND METHODS FOR SECURE COMMUNICATION BOOTSTRAPPING OF A DEVICE

(71) Applicant: MASTERCARD INTERNATIONAL INCORPORATED, Purchase, NY (US)

(72) Inventors: Brandon Craig Bryson, Wildwood, MO (US); Medha Bhatt, Bridgewater, NJ (US); Eric G. Alger, Edwardsville, IL (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 241 days.

(21) Appl. No.: 15/403,961

(22) Filed: Jan. 11, 2017

(65) Prior Publication Data
US 2018/0198763 A1   Jul. 12, 2018

(51) Int. Cl.
*H04L 29/06* (2006.01)
*H04L 9/30* (2006.01)
(Continued)

(52) U.S. Cl.
CPC ........ *H04L 63/0428* (2013.01); *H04L 9/3066* (2013.01); *H04L 9/3228* (2013.01);
(Continued)

(58) Field of Classification Search
CPC .................................................. H04L 63/0428
(Continued)

(56) References Cited

U.S. PATENT DOCUMENTS 7,146,159 B1  12/2006  Zhu
7,628,322 B2  12/2009  Holtmanns et al.
(Continued)

FOREIGN PATENT DOCUMENTS

EP      2278539      1/2011

OTHER PUBLICATIONS

Bottoni et al., Improving authentication of remote card transactions with mobile personal trusted devices, Computer Communications 30 (Feb. 2007) 1697-1712.
(Continued)

*Primary Examiner* — Longbit Chai
(74) *Attorney, Agent, or Firm* — Michael Best & Friedrich LLP

(57) ABSTRACT

Systems and methods prevent fraudulent registration of devices associated with remuneration vehicles by bootstrapping the device to be registered with a bootstrap URL. The bootstrap URL may provide access to a registration server hosted by the vehicle provider. The vehicle provider may verify a single use of the bootstrap URL. Moreover, if access to the bootstrap URL is provided to the device, the vehicle provider may provide a server access communication to the device allowing the device and vehicle provider to set up a secure communication (even if communicating via an unsecure communication path). The secure communication may be used by the vehicle provider and the device to negotiate a symmetric communication key. At least the secure access communication and the symmetric communication key may operate based on one or more of an Elliptic Curve-, Diffie Hellman-, or Elliptic Curve Diffie Hellman (ECDH)-based secure connection scheme.

17 Claims, 4 Drawing Sheets

(51) Int. Cl.
    *H04L 9/32*       (2006.01)
    *H04W 12/04*    (2009.01)
    *H04W 12/06*    (2009.01)
    *H04W 4/40*     (2018.01)
    *H04L 29/08*     (2006.01)
    *G06Q 20/02*    (2012.01)
    *H04L 9/08*     (2006.01)

(52) U.S. Cl.
    CPC ............ *H04L 9/3263* (2013.01); *H04L 63/08* (2013.01); *H04L 63/0823* (2013.01); *H04L 63/0838* (2013.01); *H04W 4/40* (2018.02); *H04W 12/04* (2013.01); *H04W 12/06* (2013.01); *G06Q 20/02* (2013.01); *H04L 9/0822* (2013.01); *H04L 9/0838* (2013.01); *H04L 9/3215* (2013.01); *H04L 63/1441* (2013.01); *H04L 63/18* (2013.01); *H04L 67/26* (2013.01); *H04L 2463/082* (2013.01)

(58) Field of Classification Search
    USPC ........................................................ 713/175
    See application file for complete search history.

(56) References Cited

U.S. PATENT DOCUMENTS

| | | | |
|---|---|---|---|
| 7,707,120 | B2 | 4/2010 | Dominguez et al. |
| 8,509,431 | B2 | 8/2013 | Schmidt et al. |
| 8,769,304 | B2 | 7/2014 | Kirsch |
| 8,843,125 | B2 | 9/2014 | Kwon et al. |
| 9,002,018 | B2 | 4/2015 | Wilkins et al. |
| 2006/0153370 | A1 | 7/2006 | Beeson |
| 2009/0132813 | A1 | 5/2009 | Schibuk |
| 2012/0115455 | A1 | 5/2012 | Rao |
| 2015/0207789 | A1 | 7/2015 | Kumar |
| 2015/0249540 | A1 | 9/2015 | Khalil et al. |
| 2016/0048833 | A1 | 2/2016 | Huxham et al. |
| 2016/0125412 | A1 | 5/2016 | Cannon |
| 2017/0295491 | A1* | 10/2017 | Gehrmann ............ H04W 12/06 |

OTHER PUBLICATIONS

Hypponen, Open Mobile Identity Secure Identity Management and Mobile Payments Using Hand-Held Devices, Doctoral Dissertation, 2009, 80 pages.

\* cited by examiner

SYSTEMS AND METHODS FOR SECURE COMMUNICATION BOOTSTRAPPING OF A DEVICE

BACKGROUND

Devices, such as computers, laptops, tablets, smartphones, etc. are frequently used with regard to sensitive information. Personal information such as passwords, account information, financial information, etc. is not only being stored on such devices, but also being transmitted to and from such devices allowing use of such devices for communications that were previously conducted in-person.

SUMMARY

Embodiments herein prevent fraudulent registration of devices associated with remuneration vehicles by bootstrapping the device to be registered with a bootstrap URL. The bootstrap URL may provide access to a registration server hosted by a vehicle provider. The vehicle provider may advantageously reduce fraudulent registration by verifying a single use of the bootstrap URL. Moreover, if access to the bootstrap URL is provided to the device, the vehicle provider may provide server access to the device, allowing the device and vehicle provider to set up a secure communication (even if communicating via an unsecure communication path). The secure communication may be used by the vehicle provider and the device to negotiate a symmetric communication key. Aspects providing secure communication, such as but not limited to the secure access communication and the symmetric communication key, may operate based on one or more of an Elliptic Curve-, Diffie Hellman-, or Elliptic Curve Diffie Hellman (ECDH)-based secure connection scheme.

In embodiments, a method for secure communication bootstrapping of a device, may include receiving a device registration request including a device identifier associated with the device. The method may include transmitting, to a network, the device identifier and a bootstrap server URL of a bootstrap authentication server hosted by a vehicle provider. The method may include receiving an access request from the device to access the bootstrap registration server. The method may also include verifying that the bootstrap registration server has not been accessed previously prior to receipt of the access request. Further, the method may include transmitting, to the device from the vehicle provider, a server certificate and a certificate authority. The method may also include negotiating with the device, via an established secure connection based on the server certificate and certificate authority, to generate a symmetric communication key.

In embodiments, a system for secure communication bootstrapping of a device, may include a registration server for registering the device, the registration server accessible via a bootstrap URL. The system may have a URL verifier for verifying that the bootstrap URL has not been previously accessed upon receipt of a bootstrap URL access request associated with the bootstrap URL. The system may generate a server access communication generated by a processor executing computer readable instructions when the URL verifier verifies that the bootstrap URL has not been previously accessed. The system may include a public key received from the device based on the server access communication. The system may also include a key negotiator for negotiating with the device to generate a symmetric communication key for secure communication with the device.

In embodiments, a system for secure communication bootstrapping of a device, may include an issuer application installed onto the device from a remote issuer server, the issuer application having a software development kit (SDK) associated with a vehicle provider. The SDK may be adapted to transmit a device registration request to the issuer server via a first communication path; transmit, via a second communication path, a bootstrap URL access request to the vehicle provider based on a bootstrap URL, the bootstrap URL received via a third communication path; and receive, via the second communication path, a server access communication from the vehicle provider. The system may also include a key negotiator for negotiating with the vehicle provider via the second communication path based on the server access communication to generate a symmetric communication key providing secure communication with the device.

DETAILED DESCRIPTION OF THE EMBODIMENTS

As indicated above, devices, such as computers, laptops, tablets, smartphones, etc. are consistently used more frequently with regard to sensitive information, including transmission and receipt of such sensitive information. In order to securely transmit/receive sensitive information, devices must be authenticated and/or registered for communication with a remote device, such as other computer(s), laptop(s), tablet(s), smartphone(s), and/or server(s).

Figure 1:
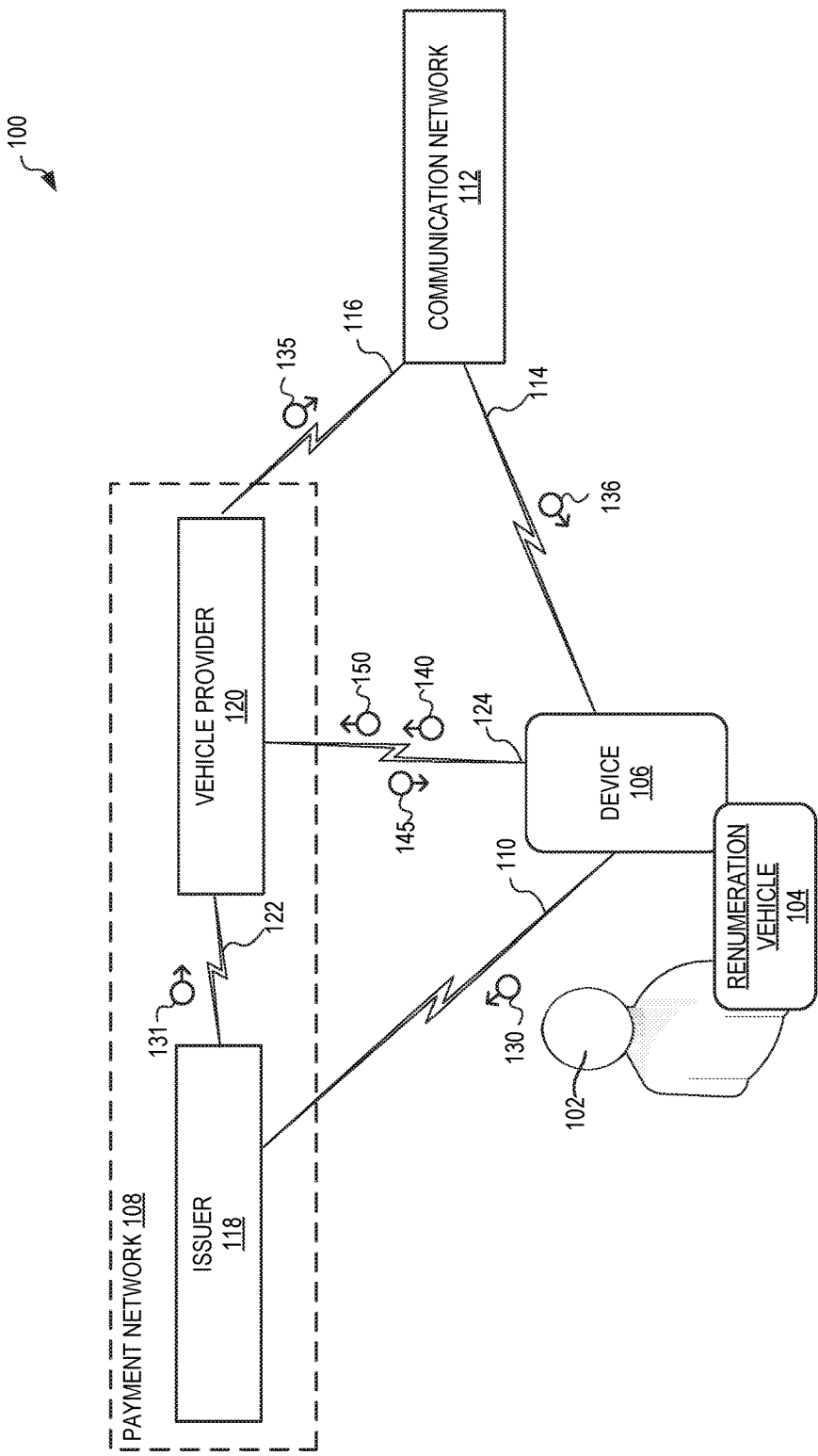
FIG. 1 depicts a system for secure communication bootstrapping of a device, in embodiments.
Figure 3:
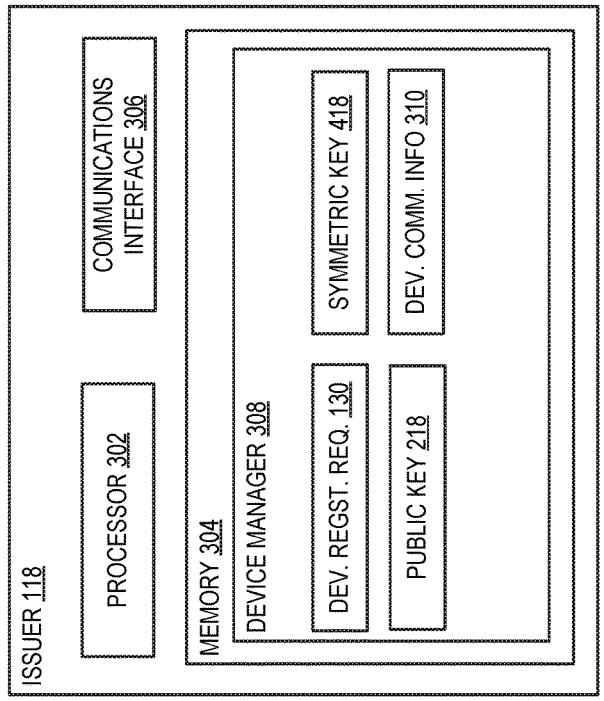
FIG. 3 depicts the issuer of FIG. 1 in further detail, in embodiments.
Figure 2:
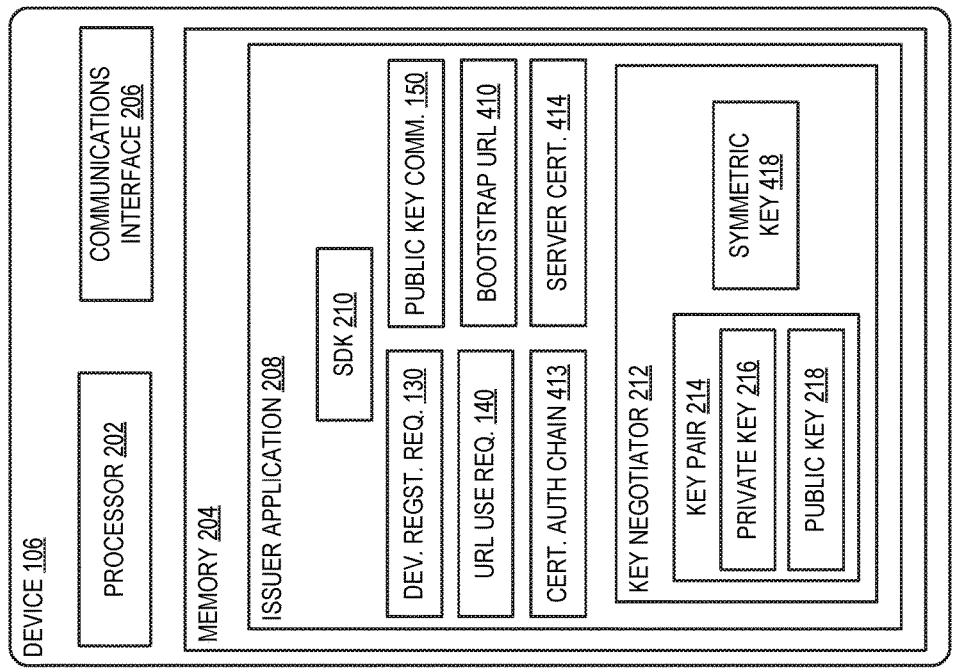
FIG. 2 depicts the device of FIG. 1 in further detail, in embodiments.
Figure 5:
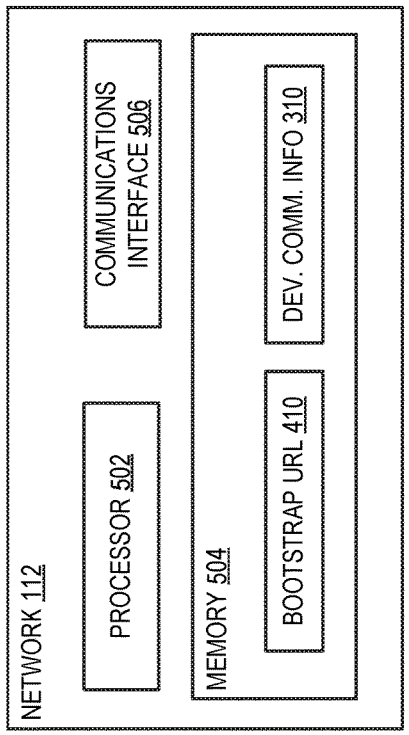
FIG. 5 depicts the communication network of FIG. 1 in further detail, in embodiments.
Figure 4:
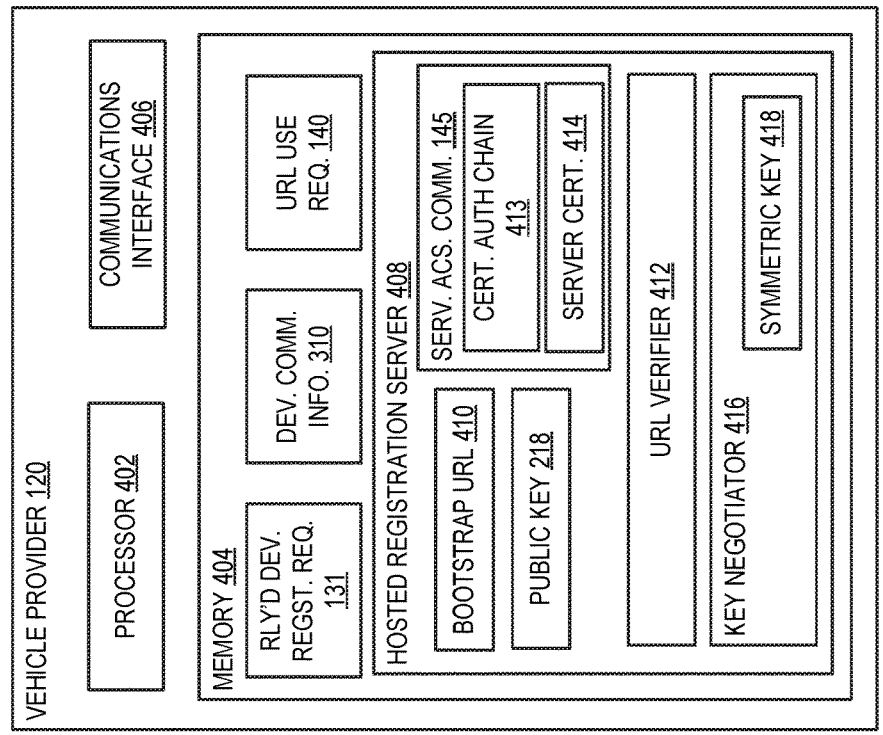
FIG. 4 depicts the vehicle provider of FIG. 1 in further detail, in embodiments.

FIG. 1 depicts a system 100 for secure communication bootstrapping of a device 106 utilized by a user 102, in embodiments. FIG. 2 depicts the device 106 of FIG. 1 in further detail, in embodiments. FIG. 3 depicts the issuer 118 of FIG. 1 in further detail, in embodiments. FIG. 4 depicts the vehicle provider 120 of FIG. 1 in further detail, in embodiments. FIG. 5 depicts the communication network 112 of FIG. 1 in further detail, in embodiments. FIGS. 1-5 are best viewed together with the following description:

User 102 may have a remuneration vehicle 104 associated therewith. Remuneration vehicle 104 represents a vehicle, or remuneration vehicle, such as a credit card (e.g. MasterCard®, Visa®, American Express®, Discover®, and Diners Club® etc.), debit card, charge card, prepaid card, gift card, bank account, financial account, e-payment account (PayPal®, Venmo®, Google® Pay, Apple® Pay, etc.), or any other resource that may be used by the user to implement a communication (e.g., a transaction).

Device 106 represents a computer, server, mobile device such as a smartphone, tablet, smartwatch, laptop, or other device capable of communicating with another device. Although device 106 is shown as a single component, it should be appreciated that device 106 may represent multiple components, such as multiple smartphones, tablets, smartwatches, and laptops. Moreover, device 106 may represent multiple components collectively forming a single device, such as a grouping of smartphones, tablets, smartwatches, laptops, or other computers that form a server.

In the embodiments shown in FIG. 1, device 106 is shown in communication with payment network 108 via first communication path 110. Device 106 is also shown in communication with communication network 112 via second communication path 114. Communication network 112 may be in communication with payment network 108 via a third communication path 116. Payment network 108 may include one or more of issuer 118 and vehicle provider 120. Issuer 118 and vehicle provider 120 may be in communication via fourth communication path 122.

Each of first, second, third, and fourth communication paths 110, 114, 116, and 122, respectively, may be implemented via a wired or wireless communication protocol, or a combination thereof. For example, a wired communication protocol may include any one or more of Ethernet, cable, fiber optic, telephonic (e.g. Public Switched Telephone Network), USB, or other hard-wired communication link. A wireless communication protocol may include any one or more of Wi-Fi, Cellular (3G, 4G, 5G, LTE, LTE-U, NB, etc.), radio frequency, or any other wireless communication link.

In embodiments, each of first, second, third, and fourth communication paths 110, 114, 116, and 122, respectively, may be configured such that communication to device 106 may only occur from issuer 118 or communication network 112. In other words, vehicle provider 120 may not be able to communicate directly with device 106 other than background communications there between. In other words, the vehicle provider 120 may silently communicate with device 106 without interaction via user 102. As such, issuer 118 may be the main point of contact with the user 102 regarding issues related to remuneration vehicle 104. In such embodiments, less maintenance and support is required on behalf of vehicle provider 120 thereby reducing costs.

As shown in FIG. 2, device 106 may include a processor 202 in communication with a memory 204, and a communications interface 206.

Processor 202 may be one or more processing devices capable of executing transitory and or non-transitory computer readable instructions stored within memory 204, and otherwise implementing/controlling functionality of device 106.

In embodiments, communications interface 206 may implement a wired or wireless communication protocol, or a combination thereof, as discussed above with respect to first, second, third, and fourth communication paths 110, 114, 116, and 122.

Memory 204 may include one or both of volatile (e.g. RAM, DRAM, SRAM, etc.) or non-volatile (e.g. ROM, PROM, EEPROM, NVRAM, flash memory, solid-state storage, optical or hard disk drives, etc.) memory (either as a single memory device, or multiple memory devices).

Memory 204 may store an issuer application 208. Issuer application 208 may be transitory and/or non-transitory computer readable instructions that, when executed by processor 202, implement the functionality discussed herein with respect to device 106. Issuer application 208 may be, in embodiments, downloaded to device 106 via first communication path 110 from issuer 118.

Issuer application 208 may include an integrated vehicle provider SDK 210. In embodiments, SDK 210 may be included with issuer application 208 when downloaded from issuer 118. In embodiments, SDK 210 may be relayed from vehicle provider 120 to issuer 118, via fourth communication path 122, for transmission to device 106 via first communication path 110. In embodiments, SDK 210 may be pushed (e.g. relayed) to device 106 through communication network 112 via second communication path 114 and third communication path 116. In embodiments, SDK 210 may be downloaded directly to device 106 from vehicle provider 120 via a direct communication path (not shown) there between. SDK 210 may provide back-end capabilities improving the issuer application 208. For example, SDK 210 may be utilized to authenticate/register devices 106 where issuer 118 does not have, or does not want, the capability to do so. As such, the support requirements necessary to implement the authentication/registration are not imposed on the issuer 118, thereby reducing costs and resources credited to the issuer 118.

Issuer application 208 may further include a key negotiator 212. Although shown separate from SDK 210, key negotiator 212 may be a component of SDK 210 without departing from the scope hereof. Key negotiator 212 may include transitory and/or non-transitory computer readable instructions that, when executed by processor 202, implement a key negotiation with a remote device (or devices such as a server) for establishing a secure communication system between the device 106 and the remote device. In embodiments, the remote device is vehicle provider 120. Key negotiator 212 may operate based on one or more of an Elliptic Curve-, Diffie Hellman-, or Elliptic Curve Diffie Hellman (ECDH)-based secure connection scheme.

As shown in FIG. 3, issuer 118 may include a processor 302 in communication with a memory 304, and a communications interface 306.

Processor 302 may be one or more processing devices capable of executing transitory and or non-transitory computer readable instructions stored within memory 304, and otherwise implementing/controlling functionality of issuer 118.

In embodiments, communications interface 306 may implement a wired or wireless communication protocol, or a combination thereof, as discussed above with respect to first, second, third, and fourth communication paths 110, 114, 116, and 122.

Memory 304 may include one or both of volatile (e.g. RAM, DRAM, SRAM, etc.) or non-volatile (e.g. ROM, PROM, EEPROM, NVRAM, flash memory, solid-state storage, optical or hard disk drives, etc.) memory (either as a single memory device, or multiple memory devices).

Memory 304 may store a device manager 308. Device manager 308 may be transitory and/or non-transitory computer readable instructions that, when executed by processor 302, implement the functionality discussed herein associated with issuer 118. Memory 304 may host a server associated with issuer application 208.

As shown in FIG. 4, vehicle provider 120 may include a processor 402 in communication with a memory 404, and a communications interface 406.

Processor 402 may be one or more processing devices capable of executing transitory and or non-transitory computer readable instructions stored within memory 404, and otherwise implementing/controlling functionality of vehicle provider 120.

In embodiments, communications interface 406 may implement a wired or wireless communication protocol, or a combination thereof, as discussed above with respect to first, second, third, and fourth communication paths 110, 114, 116, and 122.

Memory 404 may include one or both of volatile (e.g. RAM, DRAM, SRAM, etc.) or non-volatile (e.g. ROM, PROM, EEPROM, NVRAM, flash memory, solid-state storage, optical or hard disk drives, etc.) memory (either as a single memory device, or multiple memory devices).

Memory 404 may host a registration server 408 used for registering device 106 with vehicle provider 120 (and, in embodiments, payment network 108 including issuer 118). Registration server 408 may include transitory and/or non-transitory computer readable instructions that are executable by processor 402 to enable registration of device 106. Registration server 408 may be accessible (for example by device 106) via a bootstrap URL 410.

Hosted registration server 408 may include a URL verifier 412. URL verifier 412 may include transitory and/or non-transitory computer readable instructions that, when executed by processor 402, operate to verify that a URL has only been accessed a single-time. For example, URL verifier 412 may verify, upon receipt of an access request associated with bootstrap URL 410, that bootstrap URL 410 has not been accessed. Verification that bootstrap URL 410 has not been accessed provides a level of security to system 100 because the same bootstrap URL 410 cannot be hacked by a potential fraudster to trick system 100 into authenticating/registering a fraudulent device, in association with remuneration vehicle 104, that is not being utilized by user 102.

Hosted registration server 408 may further include a key negotiator 416. Although shown within hosted registration server 408, key negotiator 416 may be a component of memory 404, and not specifically located within server 408, without departing from the scope hereof. Key negotiator 416 may include transitory and/or non-transitory computer readable instructions that, when executed by processor 402, implement a key negotiation with a remote device for establishing a secure communication system between the device 106 and the remote device. In embodiments, the remote device is device 106. Key negotiator 416 may operate based on one or more of an Elliptic Curve-, Diffie Hellman-, or Elliptic Curve Diffie Hellman (ECDH)-based secure connection scheme. In embodiments, key negotiator 416 operates on the same secure communication scheme as key negotiator 212 discussed above.

As shown in FIG. 5, communication network 112 may include a processor 502 in communication with a memory 504, and a communications interface 506.

Processor 502 may be one or more processing devices capable of executing transitory and/or non-transitory computer readable instructions stored within memory 504, and otherwise implementing/controlling functionality of communication network 112.

In embodiments, communications interface 506 may implement a wired or wireless communication protocol, or a combination thereof, as discussed above with respect to first, second, third, and fourth communication paths 110, 114, 116, and 122.

Memory 504 may include one or both of volatile (e.g. RAM, DRAM, SRAM, etc.) or non-volatile (e.g. ROM, PROM, EEPROM, NVRAM, flash memory, solid-state storage, optical or hard disk drives, etc.) memory (either as a single memory device, or multiple memory devices). Memory 504 may include transitory and/or non-transitory computer readable instructions that, when executed by processor 502 implement the functionality of communication network 112 discussed herein.

Communication network 112 may operate as a server hosted by a third party, such as a mobile push network. For example, communication network 112 may operate as an Internet-based communication network implementing a relay for communications between vehicle provider 120 and device 106 via second and third communication paths 114, 116, respectively. In embodiments, communication network 112 may be an Apple Push Notification Service, a Google Cloud Messaging Service, Webpush, HTTP server push, or any other similar communication network capable of relaying a secure message between vehicle provider 120 and device 106. As such, prior to communicating with the device 106, network 112 may ensure that the bootstrap URL receiver is a valid device registered with the communication network 112.

User 102 may desire to communicate with payment network 108 (including issuer 118 and/or vehicle provider 120) via device 106 regarding various aspects of remuneration vehicle 104. Issuer application 208 may operate in conjunction with payment network 108 (e.g. with issuer 118, vehicle provider 120, or both) to authenticate/register device 106 such that secure communication may be made between payment network 108 (including issuer 118 and/or vehicle provider 120).

In embodiments, device 106 may initiate authentication/registration of device 106 by transmitting a device registration request 130 to issuer 118. In embodiments, device registration request 130 may be generated by SDK 210 within issuer application 208 and transmitted to issuer 118 via first communication path 110. Device registration request 130 may be relayed to vehicle provider 120 as relayed device registration request 131. It should be appreciated that device registration request 130 and relayed device registration request 131 may include identifying information about remuneration vehicle 104 (e.g. identification number (card number), expiration date, contact information (address, number, e-mail), CCV, etc.) and/or device 106 (e.g. a mobile identifier) allowing issuer 118 and/or vehicle provider 120 to identify the device 106 associated with issuer application 208 and remuneration vehicle 104. In embodiments, the device registration request 130 and relayed device registration request 131 may include additional (or alternative) information that allows the issuer 118, the vehicle provider 120, or both the issuer 118 and the vehicle provider 120 to identify the device 106, the user 102, or both the device 106 and the user 102. For example, the particular information may be used to identify the device 106, while in another embodiment the same or different information (including biometric information in embodiments) is used to identify the user 102.

In embodiments, relayed device registration request 131 may include additional information than device registration request 130. For example, relayed device registration request 131 may include device communication information 310 (FIG. 3). In embodiments, device communication information 310 may be a push token used by communication network 112 to communicate with device 106. By having device communication information 310 managed (e.g. stored) by issuer 118, instead of vehicle provider 120, an additional level of security is added to system 100 because a potential fraudster may not have knowledge of (or access to) where the device communication information 310 is stored. As such, the potential fraudster may not be able to acquire the information required to deceive device 106 to develop a fraudulent authentication/registration of device 106.

In embodiments, device registration request 130 (and subsequently relayed device registration request 131) may be generated in response to a "device authentication" prompt received from user 102 interacting with device 106. In other words, via interaction with device 106, such as through interaction with application 208, user 102 may implement authentication/registration of device 106. In embodiments, upon such interaction, SDK 210 may operate without interaction from user 102.

Upon receipt of relayed device registration request 131, instructions within hosted registration server 408 may be executed by processor 402 to transmit bootstrap URL 410 to device 106. For example, hosted registration server 408 may transmit a bootstrap URL communication 135 (FIG. 1) to communication network 112. Bootstrap URL communication 135 may be a data packet including bootstrap URL 410 and device communication information 310. Communication network 112 may then relay (or push) relayed bootstrap URL communication 136 (FIG. 1) to device 106 according to the device communication information 310 within the bootstrap URL communication 135. Relayed bootstrap URL communication 136 may be a data packet including bootstrap URL 410.

Upon receipt of relayed bootstrap URL communication 136, device 106 may access hosted registration server 408 using bootstrap URL 410. In embodiments, SDK 210 may generate a bootstrap URL access request 140 to access hosted registration server 408 via bootstrap URL 410 without any interaction by user 102. Bootstrap URL access request 140 may be a data packet attempting to establish a fifth communication path 124 between device 106 and vehicle provider 120. Fifth communication path 124 may be a silent communication path that does not involve interaction with device 106 by user 102.

Upon receipt of bootstrap URL access request 140, URL verifier 412 may verify that bootstrap URL 410 has not been previously accessed by any device, including device 106, prior to receipt of bootstrap URL access request 140.

If URL verifier 412 verifies that bootstrap URL access request 140 is the first attempt to access bootstrap URL 410, then hosted registration server 408 may transmit a server access communication 145 (FIG. 1) including a certificate authority chain 413 and server certificate 414. In embodiments, certificate authority chain 413 and server certificate 414 may be Elliptic Curve-, Diffie Hellman-, or Elliptic Curve Diffie Hellman (ECDH)-based components. For example, an ECDH-based server certificate 414 may include an anonymous key agreement protocol that allows two parties (i.e. device 106 and vehicle provider 120), each having an elliptic curve public-private key pair, to establish a shared secret over an insecure channel (e.g. fifth communication path 124).

Upon receipt of server access communication 145, the certificate authority chain 413 and server certificate 414 may be stored within memory 204. In embodiments, the certificate authority chain 413 and server certificate 414 are stored in a secured section of memory 204 (e.g. a local trust store within memory 204) such that a potential fraudster cannot obtain access remote from memory 204.

Based on the stored certificate authority chain 413 and server certificate 414, key negotiator 212 of device 106 may then establish a key pair 214 for securely communicating with device 106 via a secured or unsecured communication path. Key pair 214 may include a private key 216 and a public key 218. Private key 216 may be known solely by device 106 for verification of secured communication with another device having knowledge of public key 218. As such, upon generation of key pair 214, device 106 may transmit a public key communication 150. Public key communication 150 may be transmitted to vehicle provider 120 via fifth communication path 124 (which may be secured or unsecured). In embodiments, public key communication 150 may also be transmitted to issuer 118 if a communication is desired between issuer 118 and device 106.

Upon receipt of public key 218, vehicle provider 120 may cooperate with device 106 to negotiate a symmetric communication key 418 that provides future secure communication with device 106. In embodiments, key negotiator 212, of device 106, and key negotiator 416, of vehicle provider 120 may simultaneously negotiate using public key 218 to negotiate symmetric communication key 418. As such, symmetric communication key 418 may be based on one or more of an Elliptic Curve-, Diffie Hellman-, or Elliptic Curve Diffie Hellman (ECDH)-based secure connection scheme. The symmetric communication key 418 may be generated by the device 106 or the vehicle provider 120, and may be transmitted to any of the other components within system 100.

Figure 6:
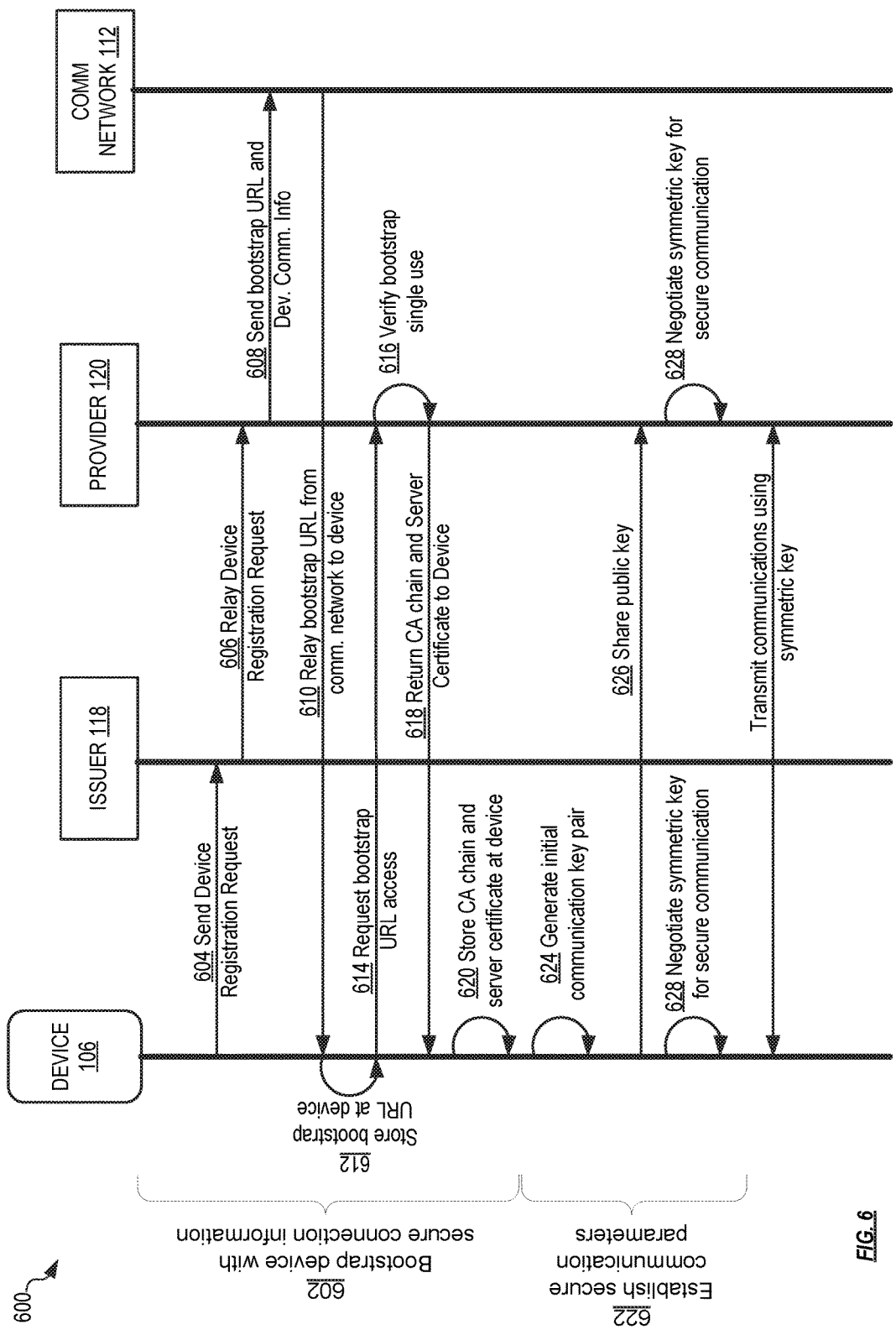
FIG. 6 depicts a method for secure communication bootstrapping of a device, in embodiments.

FIG. 6 depicts a method 600 for secure communication bootstrapping of a device, in embodiments. For example, method 600 may be implemented in one or more components of system 100, discussed above with respect to FIGS. 1-5.

In operation 602, method 600 bootstraps a device with secure connection information. In embodiments of operation 602, device 106 is bootstrapped with secure connection information from vehicle provider 120.

Operation 602 may include one or more sub-operations. In sub-operation 604 of operation 602, a device registration request is sent from a device to a server remote therefrom (e.g. payment network 108 or a component thereof). In embodiments of sub-operation 604, device registration request 130 is transmitted from device 106 to issuer 118 via first communication path 110. In embodiments, device registration request 130 of sub-operation 604 may be generated by SDK 210 within issuer application 208 and transmitted to issuer 118 via first communication path 110. In embodiments, device registration request 130 may include one or more of identifying information about remuneration vehicle 104 (e.g. identification number (card number), expiration date, and/or contact information (address, number, e-mail), CCV, etc.) allowing issuer 118 and/or vehicle provider 120 to identify the device 106 associated with issuer application 208 and remuneration vehicle 104. In embodiments, the device registration request 130 may include information that allows the issuer 118, the vehicle provider 120, or both the issuer 118 and the vehicle provider 120 to identify the device 106, the user 102, or both the device 106 and the user 102. In an embodiment, the particular information is used to identify the device 106, while in another embodiment the same or different information (including biometric information in certain embodiments) is used to identify the user 102.

In sub-operation 606 of operation 602, a relayed device registration request is transmitted to a vehicle provider. In embodiments of sub-operation 606, relayed device registration request 131, discussed above, may be transmitted to vehicle provider 120. In embodiments, the relayed device registration of sub-operation 606 may include additional information than device registration request of sub-operation 604. For example, relayed device registration request 131 may include device communication information 310. In embodiments, device communication information 310 additionally included in relayed device registration of sub-operation 606 may be push token used by communication network 112 to communicate with device 106.

In sub-operation 608 of operation 602, a bootstrap URL communication (including one or both of a bootstrap URL and device communication information, if included in sub-operation 606) is transmitted to a communication network. In embodiments of sub-operation 608, hosted registration server 408 may transmit a bootstrap URL communication 135 (which may include one or both of bootstrap URL 410 and device communication information 310) to communication network 112 via third communication path 116.

In sub-operation 610 of operation 602, a relayed bootstrap URL communication is transmitted from a communication network to a device. In embodiments, relayed bootstrap URL communication 136 is transmitted from communication network 112 to device 106 via second communication path 114. In embodiments, relayed bootstrap URL communication may be based upon the device communication information (e.g. device communication information 310) received in sub-operation 608.

In sub-operation 612 of operation 602, the relayed bootstrap URL from sub-operation 610 is stored in a device. In embodiments, the relayed bootstrap URL 410 is stored in memory 204 of device 106.

In sub-operation 614 of operation 602, the device transmits bootstrap URL access request to connect to the server according to the bootstrap URL stored in sub-operation 612. In embodiments, device 106 transmits bootstrap URL access request 140 to vehicle provider 120 to access hosted registration server 408.

In sub-operation 616 of operation 602, method 600 verifies that the bootstrap URL has only been used once. In embodiments of sub-operation 616, URL verifier 412 verifies that bootstrap URL 410 has not been accessed prior to receipt of bootstrap URL access request from sub-operation 614. If bootstrap URL has not been previously accessed, then method 600 proceeds to sub-operation 618; else, method 600 terminates and/or waits for a bootstrap URL access request of a bootstrap URL that has not been previously accessed.

In sub-operation 618 of operation 602, the vehicle provider transmits a server access communication to the device. In embodiments, vehicle provider 120 transmits server access communication 145 including certificate authority chain 413, and server certificate 414 to device 106 via fifth communication path 124. Server access communication 145 may include information (e.g. certificate authority chain 413, and server certificate 414) based on one or more of an Elliptic Curve-, Diffie Hellman-, or Elliptic Curve Diffie Hellman (ECDH)-based secure connection scheme.

In sub-operation 620 of operation 602, the information within the server access communication of sub-operation 618 is stored within the device. In embodiments, device 106 stores the certificate authority chain 413, and server certificate 414 within memory 204. In embodiments, the information within the server access communication of sub-operation may be stored in a secure area of the device memory (e.g. within a local trust store of memory 204).

In operation 622, method 600 establishes secure communication parameters for future communications between the device and the server remote therefrom (e.g. payment network 108 or a component thereof). In embodiments of operation 622, symmetric communication key 418 is generated to allow secure communications between device 106 and payment network 108, including one or both of issuer 118 and vehicle provider 120. In embodiments, the secure communication parameters are based on one or more of an Elliptic Curve-, Diffie Hellman-, or Elliptic Curve Diffie Hellman (ECDH)-based secure connection scheme.

Operation 622 may include one or more of the following sub-operations. For example, in sub-operation 624 of operation 622, the device may generate an initial communication key pair for secure communication between the device and the vehicle provider. In embodiments of sub-operation 624, device 106, for example using key negotiator 212, generates key pair 214 including private key 216 and public key 218. In embodiments, initial communication key pair may be based on one or more of an Elliptic Curve-, Diffie Hellman-, or Elliptic Curve Diffie Hellman (ECDH)-based secure connection scheme.

In sub-operation 626 of operation 620, the device transmits the public key of the initial communication key pair generated in sub-operation 624 to the vehicle provider. In embodiments, device 106 transmits, via fifth communication path 124, public key 218 to vehicle provider 120.

In sub-operation 628 of operation 620, the device and vehicle provider negotiate a symmetric communication key for future communications with the device. In embodiments, key negotiator 212, of device 106, and key negotiator 416, of vehicle provider 120, negotiate (using private key 216 and public key 218) to generate symmetric communication key 418. The symmetric communication key 418 may then be transmitted to other devices, such as issuer 118 or other components of payment network 108, allowing for secure communications with device 106.

The systems and methods for secure communication bootstrapping of a device discussed herein (e.g. system 100 discussed with regards to FIGS. 1-5, and method 600 discussed with regard to FIG. 6) provide many advantages. For example, an advantage is provided by storing device communication information (e.g. device communication information 310) in the issuer 118 as opposed to vehicle provider 120 where the secure communication parameters (e.g. symmetric communication key 418) is being negotiated. As such, potential fraudsters are unable to readily identify what information is necessary to fraudulently represent the fraudsters' device as device 106.

As another example, an advantage is provided because the SDK 210 provides back-end services to the issuer application 208 thereby reducing support costs and SDK development costs for the issuer 118.

As another example, an advantage is provided because the device 106 is "bootstrapped" with the bootstrap URL, thereby additionally reducing fraud associated with the bootstrap URL. Potential fraudsters may not know the bootstrap URL, and as such may not have access to set up secure communication parameters.

As another example, an advantage is provided by verifying the bootstrap URL has not been previously accessed. Ensuring a single-use bootstrap URL, for example using URL verifier 412, provides for a secure communication link between the device 106 and the vehicle provider 120 because a potential fraudster cannot reuse a bootstrap URL sent to the device 106.

Another advantage is supplying the server certificate and certificate authority chain (e.g. server certificate 414 and certificate authority chain 413) after one time use of a bootstrap URL (e.g. bootstrap URL 410) is confirmed as opposed to packaging those values with the SDK (e.g. SDK 210). This reduces possible fraud associated with extracting the values from the SDK.

As another example, by utilizing mobile communication networks (i.e. communication network 112) such as an Apple Push Notification Service and/or a Google Cloud Messaging Service or any other similar communication network capable of relaying a secure message between vehicle provider 120 and device 106, an advantage is provided that, prior to communicating with the device 106, communication network 112 may ensure that the bootstrap URL receiver is a valid device registered with the communication network 112.

The above examples of advantages are not necessarily independent from each other, and it should be appreciated that these advantages collectively, or individually, significantly increase security associated with communications to and from devices.

It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for secure communication bootstrapping of a device, comprising:
    receiving, at a vehicle provider, a device registration request from the device, the device registration request including a device identifier associated with the device;
    transmitting, from the vehicle provider to a network, the device identifier and a bootstrap server URL in response to receiving the device registration request, the bootstrap server URL associated with a bootstrap registration server hosted by the vehicle provider;
    receiving, at the vehicle provider, an access request from the device to access the bootstrap registration server, the access request including the bootstrap server URL;
    verifying, in response to receiving the access request, that the bootstrap registration server has not been previously accessed using the bootstrap server URL prior to receipt of the access request;
    transmitting, from the vehicle provider, a server certificate and a certificate authority chain to the device; and
    negotiating with the device, via an established secure connection based on the server certificate and certificate authority chain, to generate a symmetric communication key for secure communication with the device.

2. The method of claim 1, the device registration request being a relayed device registration request relayed to the vehicle provider from an issuer server, the device identifier being added to the relayed device registration request by the issuer server.

3. The method of claim 1, the server certificate being based on an Elliptic Curve certificate protocol.

4. The method of claim 1, the symmetric communication key being based on a Elliptic Curve Diffie Hellman key agreement protocol.

5. The method of claim 1, further comprising receiving a communication from the device including the symmetric communication key.

6. The method of claim 1, further comprising transmitting a communication to the device including the symmetric communication key.

7. A system for secure communication bootstrapping of a device, comprising:
    a bootstrap registration server for registering the device, the bootstrap registration server configured to receive a device registration request from the device and transmit a bootstrap server URL to a network, the bootstrap registration server accessible via the bootstrap server URL;
    a URL verifier for verifying that the bootstrap server URL has not been previously accessed upon receipt of a bootstrap server URL access request associated with the bootstrap server URL;
    a server access communication generated by a hardware processor executing computer readable instructions when the URL verifier verifies that the bootstrap server URL has not been previously accessed, the server access communication including a server certificate and a certificate authority chain;
    a public key received from the device based on the server access communication; and,
    a key negotiator for negotiating with the device to generate a symmetric communication key for secure communication with the device.

8. The system of claim 7, the server certificate being based on an Elliptic Curve certificate protocol.

9. The system of claim 7, the symmetric communication key being based on a Elliptic Curve Diffie Hellman key agreement protocol.

10. The system of claim 7, further comprising a communications interface coupled to a communication network via a communication path, the bootstrap URL being transmitted within a bootstrap URL communication to the device via the communication path.

11. The system of claim 10, the bootstrap URL communication being transmitted in response to receipt of the device registration request.

12. The system of claim 11, the device registration request being a relayed device registration request relayed from an issuer server.

13. The system of claim 11, the bootstrap URL communication including device communication information.

14. The system of claim 13, the device registration request being a relayed device registration request relayed from an issuer server, the device communication information being received within the relayed device registration request.

15. A system for secure communication bootstrapping of a device, comprising:
    an issuer application installed onto the device from a remote issuer server, the issuer application having a software development kit (SDK) associated with a vehicle provider, the SDK configured to:
      transmit, from the device, a device registration request to the issuer server via a first communication path,
      transmit, from the device, a bootstrap URL access request to the vehicle provider via a second communication path for accessing a bootstrap registration server, the bootstrap URL access request based on a bootstrap server URL, the bootstrap server URL received by the device via a third communication path, and
      receive, via the second communication path, a server access communication from the vehicle provider after a first request to access the bootstrap registration server, the server access communication including a server certificate and a certificate authority chain; and,
    a key negotiator for negotiating with the vehicle provider via the second communication path and based on the server access communication to generate a symmetric communication key providing secure communication with the device.

16. The system of claim 15, the server certificate being based on an Elliptic Curve certificate protocol.

17. The system of claim 15, the symmetric communication key being based on a Elliptic Curve Diffie Hellman key agreement protocol.

\* \* \* \* \*